(12) United States Patent
Young et al.

(10) Patent No.: US 10,286,743 B2
(45) Date of Patent: May 14, 2019

(54) VEHICLE AXLE SUSPENSION ARRANGEMENT

(71) Applicant: Continental Automotive Systems, Inc., Auburn Hills, MI (US)

(72) Inventors: Kent R. Young, Grand Blanc, MI (US); Sunny Makkar, Troy, MI (US)

(73) Assignee: Continental Automotive Systems, Inc., Auburn Hills, CA (US)

( * ) Notice: Subject to any disclaimer, the term of this patent is extended or adjusted under 35 U.S.C. 154(b) by 0 days.

(21) Appl. No.: 15/264,175

(22) Filed: Sep. 13, 2016

(65) Prior Publication Data

US 2018/0072123 A1    Mar. 15, 2018

(51) Int. Cl.
*B60G 17/04* (2006.01)
*B60G 11/46* (2006.01)

(52) U.S. Cl.
CPC ........ *B60G 11/465* (2013.01); *B60G 2200/31* (2013.01); *B60G 2202/112* (2013.01); *B60G 2202/152* (2013.01); *B60G 2500/22* (2013.01)

(58) Field of Classification Search
CPC .. B60G 5/047; B60G 11/465; B60G 2200/31; B60G 2202/112; B60G 2204/111; B60G 2204/121; B60G 2204/126; B60G 2202/152; Y10T 29/49826
USPC .............................. 280/124.116, 124.17, 680
See application file for complete search history.

(56) References Cited

U.S. PATENT DOCUMENTS

| | | | | |
|---|---|---|---|---|
| 3,730,548 A * | 5/1973 | Thaxton | ............... | B60G 11/465 267/31 |
| 3,730,550 A * | 5/1973 | Thaxton | ............... | B60G 11/465 267/31 |
| 4,033,608 A * | 7/1977 | Sweet | .................. | B60G 17/052 267/31 |
| 5,938,221 A * | 8/1999 | Wilson | .................... | B60G 11/10 267/260 |
| 6,129,369 A * | 10/2000 | Dudding | ................ | B60G 11/12 267/270 |
| 6,406,007 B1 * | 6/2002 | Wilson | .................... | B60G 11/02 267/283 |
| 6,527,287 B2 * | 3/2003 | Hedenberg | ........... | B60G 11/465 267/31 |
| 7,104,560 B2 * | 9/2006 | Momiyama | ............ | B60G 9/025 280/124.107 |
| 7,850,195 B2 * | 12/2010 | Simard | .................. | B60G 5/047 280/124.163 |
| 2004/0080135 A1 * | 4/2004 | Dudding | .................. | B60G 7/04 280/124.163 |
| 2007/0013160 A1 * | 1/2007 | Richardson | ............ | B60G 7/006 280/124.116 |
| 2007/0145706 A1 * | 6/2007 | Penzotti | .................. | B60G 11/12 280/124.174 |
| 2009/0020973 A1 * | 1/2009 | Richardson | .............. | B60G 3/18 280/124.17 |
| 2011/0140388 A1 * | 6/2011 | Juriga | ...................... | B60G 9/02 280/124.163 |

* cited by examiner

*Primary Examiner* — Toan C To

(57) ABSTRACT

A suspension arrangement for passenger car, an SUV or light truck is provided. The suspension arrangement includes a frame for said vehicle and an axle with rotatably mounted wheels. A leaf spring is provided connected with the frame and connected with the axle. The leaf spring has a contribution to the total axle ride frequency less than 80% of the total axle ride frequency. An air spring acting in parallel with the leaf spring is also provided.

13 Claims, 1 Drawing Sheet

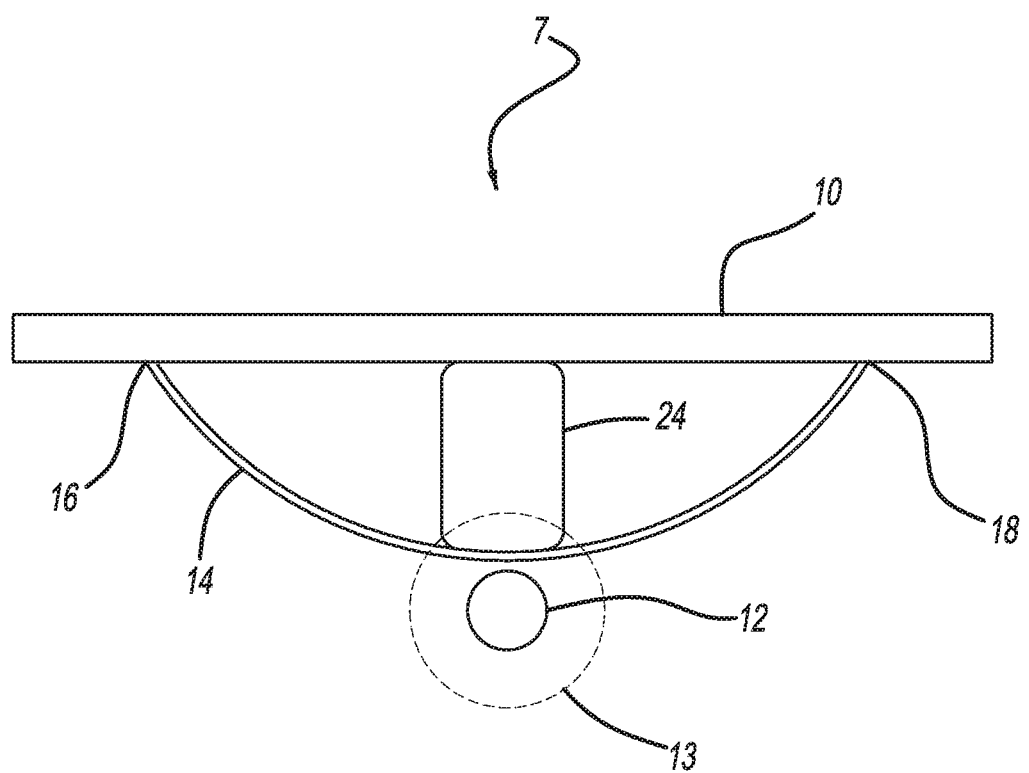

VEHICLE AXLE SUSPENSION ARRANGEMENT

FIELD OF THE INVENTION

The present invention relates to suspension arrangement in automotive vehicles. More particularly the field of the present invention relates to suspension arrangements highly useful in the rear axles of passenger car vehicles, sport-utility vehicles, or light truck vehicles

BACKGROUND OF THE INVENTION

In a Hotchkiss driveline and suspension arrangement layout, a vehicle axle is suspended by a pair of longitudinally mounted semi-elliptical leaf springs that serve to locate the axle as well as support the weight of the body. The front portion of each leaf spring functions like a trailing arm, transmitting drive torque to the body and resisting squat and axle tramp. A rear portion of the leaf spring acts as a leading arm, resisting wheel hop under braking. The stiffness of the leaf springs also serves to resist axle lateral motions. By making the springs perform multiple duties, a Hotchkiss drive is very simple and thus very cheap. Since it has few parts, it's also very sturdy.

To allow for the raising/lowering of the vehicle, load levelling, and to enhance the smoothness of the vehicle's ride, it is desirable to provide air suspension systems on automotive vehicles. A more detailed explanation of the benefits of a four corner air suspension system on light truck vehicles can be found in a review of U.S. Patent Application System and Method Using Air Suspension to Improve Vehicle Unloading commonly assigned U.S. patent application Ser. No. 14/081,272. If a vehicle employs a Hotchkiss type of suspension, installation of a four corner air suspension system is currently not possible. The leaf spring cannot be removed and replaced by an air spring since the leaf spring acts both as the longitudinal link as well as a spring. Replacement of the leaf spring with an air spring leaves the axle unsupported longitudinally and laterally. It is desirable to provide vehicles with a Hotchkiss type suspension that has air spring capabilities.

SUMMARY OF THE INVENTION

To make manifest the above-noted and other desires, a revelation of the present invention is brought forth. The present invention endows a freedom of a suspension arrangement for a passenger car, an SUV or light truck vehicle. The inventive suspension arrangement includes a frame for said vehicle, an axle with a rotatably mounted wheel, a leaf spring connected with the frame and connected with the axle. The leaf spring has a contribution of axle ride frequency less than 80% of the complete ride frequency (for the entire load range of the vehicle, from lightest loaded vehicle to heaviest loaded vehicle). An air spring is also provided acting in parallel with the leaf spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWING

The present invention will become more fully understood from the detailed description and the accompanying drawings, wherein:

FIG. 1 is a schematic side elevational view of a suspension arrangement according to the present invention for each side of a vehicle.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, a suspension arrangement 7 for a rear axle of a passenger car vehicle, sport-utility vehicle or light truck vehicle according to the present invention is provided. The suspension arrangement includes a frame 10 of the vehicle. As described herein, the term "frame" refers to vehicle supporting structures including but not limited to ladder frames, unibody chassis, and subframes. The suspension arrangement 7 also includes an axle 12. At opposite ends of the axle 12 there are rotatably mounted wheels 13 which may or may not powered wheels, but in most applications will be powered rear wheels of passenger, sport utility retail vehicle or pick-up type light truck vehicle. However the present invention can be utilized on power or non-powered front axles of a vehicle. Additionally provided is a single or multiple leaf spring 14. As shown in FIG. 1, a leaf spring 14 has a front end 16 pivotally connected to the frame 10, directly or by a trailing or leading link. The leaf spring 14 also has a rear end 18 directly or by a trailing or leading link pivotally connected to the frame 10. The primary function of the leaf spring 14 is that it will act as a suspension link and not as a spring. In most instances a spring rate in the leaf spring 14 is designed to be low enough that without additional spring forces, the vehicle jounce bumpers (not shown) are engaged by the leaf spring 14. The suspension arrangement 7 also has a main air spring 24. As defined herein, the single main air spring may be a single bladder member or multiple bladders in series or parallel. The main air spring 24 acts in parallel with the leaf spring 14.

For the two springs in parallel:

$$k_{parallel} = k_1 + k_2$$

Considering the Leaf spring in parallel with the Air Spring $$k_T = k_L + k_A$$

$k_T$=Equivalent stiffness=Total Spring Constant
$k_L$=Leaf spring stiffness=Leaf Spring Constant
$k_A$=Air spring stiffness=Air Spring Constant (when the vehicle is unloaded)

$$\omega_T^2 = \omega_L^2 + \omega_A^2 \qquad (1)$$

$$\text{since } \omega^2 = \frac{k}{\text{mass}}$$

$\omega_L$=Contribution of Leaf Spring to Axle Ride Frequency
$\omega_A$=Contribution of Air Spring to Axle Ride Frequency
$\omega_T$=Complete Axle Ride Frequency
If:

$$\left| \frac{\omega_L}{\omega_T} < 0.8 \right| \qquad (2)$$

$$\omega_A > 0.75 \omega_L \qquad \text{From (1) and (2)}$$

$$k_A > 0.5625 k_L \qquad (3)$$

The present invention allows the use of Hotchkiss type suspension while still allowing low levelling, high positioning capabilities without excessively high axle ride frequencies.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A suspension arrangement for a passenger car vehicle, a sport utility vehicle or light truck vehicle, the suspension arrangement comprising:
   a frame for said vehicle;
   an axle with a rotatably mounted wheel;
   a leaf spring connected with said frame and connected with said axle, said leaf spring having a first spring constant and said leaf spring provides a contribution of less than 80% of a complete axle ride frequency; and
   an air spring acting in parallel with said leaf spring, said air spring being configured to have a second spring constant, which is different from the first spring constant and the air spring is configured to provide a remainder of the complete axle ride frequency not provided by the leaf spring.

2. The suspension arrangement as described in claim 1 wherein said suspension arrangement is for a rear axle of the vehicle.

3. The suspension arrangement as recited in claim 1, wherein the second spring constant of the air spring is greater than 50% of the first spring constant of the leaf spring.

4. The suspension arrangement as recited in claim 1, wherein the air spring operates in parallel with the leaf spring.

5. The suspension arrangement as recited in claim 1, wherein the air spring is configured to provide a contribution greater than about 75% of the contribution by the leaf spring to the axle ride frequency.

6. The suspension arrangement as recited in claim 1, wherein the leaf spring includes a front end and a rear end and at least one of the front end and the rear end is pivotally connected to the frame directly.

7. The suspension arrangement as recited in claim 1, wherein the leaf spring includes a front end and a rear end and at least one of the front end and the rear end is pivotally connected to the frame through a link.

8. A suspension arrangement for a passenger car vehicle, a sport utility vehicle or light truck vehicle, the suspension arrangement comprising:
   a frame for said vehicle;
   an axle with rotatably mounted wheels at opposite ends of said axle;
   two leaf springs laterally spaced from one another, said leaf springs being connected with said frame and connected with said axle, said leaf springs being sized, shaped and arranged to have a predetermined first spring constant, wherein the two leaf springs provide a contribution of less than 80% of a complete ride frequency of said axle; and
   an air spring acting in parallel each of said leaf springs, wherein the air spring is sized, shaped and arranged to have a predetermined second spring constant and to provide a remainder of the complete ride frequency not provided by said first spring constant.

9. The suspension arrangement as recited in claim 8, wherein the second spring constant of the air spring is greater than 50% of the first spring constant of the leaf spring.

10. The suspension arrangement as recited in claim 8, wherein the air spring operates in parallel with the leaf spring.

11. The suspension arrangement as recited in claim 8, wherein the air spring is configured to provide a contribution greater than about 75% of the contribution by the leaf spring to the axle ride frequency.

12. The suspension arrangement as recited in claim 8, wherein the leaf spring includes a front end and a rear end and at least one of the front end and the rear end is pivotally connected to the frame directly.

13. The suspension arrangement as recited in claim 8, wherein the leaf spring includes a front end and a rear end and at least one of the front end and the rear end is pivotally connected to the frame through a link.

* * * * *